(No Model.)
G. W. SCHOELLER.
EYEGLASSES.
No. 433,372.
Patented July 29, 1890.
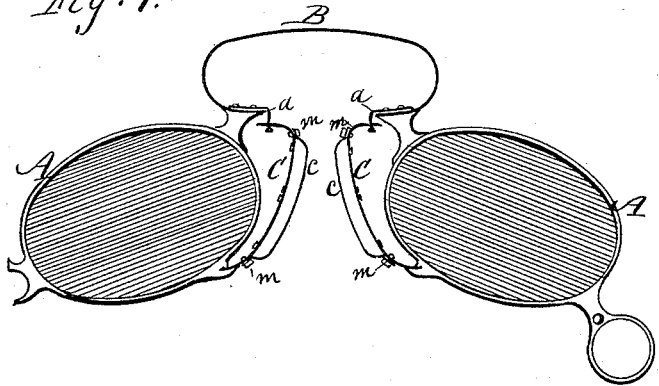
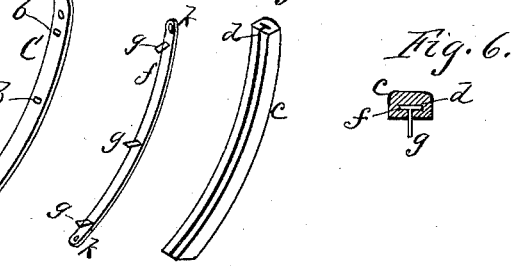

United States Patent Office.

GEORGE W. SCHOELLER, OF ROCHESTER, NEW YORK, ASSIGNOR TO THE BAUSCH & LOMB OPTICAL COMPANY, OF SAME PLACE.

EYEGLASS.

SPECIFICATION forming part of Letters Patent No. 433,372, dated July 29, 1890.

Application filed October 22, 1887. Serial No. 263,095. (No model.)

*To all whom it may concern:*

Be it known that I, GEORGE W. SCHOELLER, of Rochester, in the county of Monroe and State of New York, have invented a certain new and useful Improvement in Eyeglasses; and I do hereby declare that the following is a full, clear, and exact description of the same, reference being had to the drawings accompanying this application.

My improvement relates to that class of eyeglasses in which pads made of cork or other suitable material are attached to the nosepieces and are designed to hold the eyeglasses to the nose and secure ease and comfort to the wearer.

The invention is especially applicable to cork, and is designed to furnish a simple, cheap, and effective attachment for the pads to the nose-pieces; and to this end the invention consists in the construction and arrangement hereinafter described and claimed.

In the drawings, Figure 1 is a face view of a pair of eyeglasses provided with my improvement. Fig. 2 is a longitudinal vertical section of one of the nose-pieces enlarged. Figs. 3, 4, and 5 are perspective views, respectively, of one of the nose-pieces, the attaching-strip, and the pad. Fig. 6 is an enlarged cross-section of one of the pads and its attaching-strip.

A A indicate the glass-frames, and B the connecting-spring, which are of ordinary form and construction.

C C are the nose-pieces, which may be of any desired form, but, as shown in the drawings, are springs attached at their lower ends to the glass-frames and at the top have a free movement inward, being held by guides $a\ a$. If desired, the nose-pieces may be formed stiff with the glass-frames or made an integral part of the same. These nose-pieces are provided with one or more holes or sockets $b\ b$ to receive the tongues of the attaching-strips, as will be hereinafter described.

$c\ c$ are the pads, which are made of cork or any equivalent material suitable for the purpose, the same being provided with T-shaped slits $d\ d$ on their inner sides, extending their whole length, as shown in the perspective view, Fig. 5. These slits are made by a suitable instrument.

$f\ f$ are the attaching-strips, made of metal and provided with rearwardly - projecting tongues or spurs $g\ g$, whose length is sufficient to pass through the holes $b\ b$ of the nose-pieces and clinch down on the back side, and provided at the ends with eyes $k\ k$, through which pass small screws $m\ m$ to attach the strips to the frame or nose-piece. This is especially applicable at the ends of the strips, the middle being provided with tongues, as aforesaid.

To attach the pads, the metallic T-shaped strips are slipped endwise into the slits of the pads, the tongues or spurs $g\ g$ running through the opening in the inner side. The pads are then applied to the nose-pieces and the tongues $g\ g$ run through the holes $b\ b$ therein and bent over to clinch them in place, as shown in the sectional view, Fig. 2, while the screws $m\ m$ pass through the eyes $k\ k$ at the ends. The strips may be made in single pieces of the length of the pad or each of two or more pieces inserted end to end in the slits. Any desired number of the tongues or spurs $g\ g$ may be used. A single one in the center is effective; but in ordinary eyeglasses three are preferably used, one in the center and one at each end.

One important advantage of this invention is that the pads are readily applied and removed. To remove them it is only necessary to straighten the tongues or spurs $g\ g$ and draw them out of the holes of the nose-pieces. The attaching-strips are then readily removable from the pads by slipping them out endwise. By this means repairs can be readily made, which has heretofore been difficult, especially where cork pads have been employed.

The ordinary methods of attaching cork pads have been to clamp them down by a back piece having lips that turn over and embrace the edges of the cork, or to make dovetailed metallic clamp-pieces, over which the edges of the cork are bent and made to enter the dovetails, or to cement two strips to the nose-piece, thereby inclosing it, in all of which much labor is involved, and the pad is not readily removable so that the nose-piece can be used again. By this invention the metal is all inclosed by the pad and out of sight, and the pad only comes in contact with the nose.

Having described my invention, I do not claim an eyeglass in which the pad is drawn around the edges of a holder and embedded in grooves thereof; but

What I claim as new, and desire to secure by Letters Patent, is—

1. In an eyeglass, the combination, with a pad having a T-shaped slit cut in its solid body, of an attaching-piece consisting of a thin strip fitting in the closed cross portion of the slit, and a lug or lugs forming an attaching device projecting out through the open portion of the slit, as and for the purpose specified.

2. In an eyeglass, the combination, with the nose-piece having holes, of a pad provided with a T-shaped slit in its inner side, and an attaching-piece consisting of a metallic strip provided with spurs, the strip fitting in the slit of the pad and the spurs passing through the holes of the nose-piece and clinched in place, as described.

3. In an eyeglass, the combination of the nose-piece having holes to admit the spurs of the attaching-pieces and sockets to receive screws, the pad provided with a T-shaped slit in its inner side, and an attaching-piece consisting of a strip provided with spurs to fit the holes and with eyes to allow the insertion of screws to fasten to the nose-piece, as described.

In witness whereof I have hereunto signed my name in the presence of two subscribing witnesses.

GEORGE W. SCHOELLER.

Witnesses:
EDMUND FILGERWEISNER,
JOSEPH PETZ.